United States Patent Office 3,487,816
Patented Jan. 6, 1970

3,487,816
ROTARY ENGINE
James Malcolm Wild, Pennant Hills, and Stephen Mezei, Lindfield, New South Wales, Australia, assignors to M. W. Rotary (International) Development Pty. Limited, Gordon, New South Wales, Australia, a corporation of New South Wales, Australia
Filed Mar. 7, 1968, Ser. No. 711,295
Claims priority, application Australia, Mar. 13, 1967, 18,891; Apr. 18, 1967, 20,509
Int. Cl. F02b 53/00, 55/02, 55/00
U.S. Cl. 123—16                                    12 Claims

ABSTRACT OF THE DISCLOSURE

A rotary internal combustion engine in which induction and compression strokes are carried out in a separate chamber employing a compression rotor mounted on the same shaft as a working rotor in the combustion chamber, communication between chambers occuring immediately prior to the initiation of combustion.

---

This invention relates to internal combustion engines, and has for its main object the provision of a novel engine of the rotary type.

While some previous efforts to avoid the inefficiencies of conventional reciprocating engines with their large frictional losses and many moving parts by means of rotary type engines have met with some success, yet these previous engines have themselves suffered from a lack of mechanical simplicity, in their use of cranks and relatively complicated valves.

The present invention provides a novel rotary engine, having no major reciprocating parts and a greatly reduced number of moving parts. The invention also allows for the construction of an engine with a highly efficient combustion chamber, designed so as to allow of almost complete combustion of fuel mixture before exhausting occurs at close to ambient temperature and pressure.

A further object of the present invention is to provide a rotary engine in which combustion products and carbon deposits and the like are positively scavenged from the combustion chamber.

An additional object is to provide a rotary engine the compression ratio and power of which may be readily altered, even while the engine is running under load.

Further objects and advantages of the present invention will be apparent from the following description.

According to the present invention, a rotary engine comprises at least one working rotor and at least one compression rotor mounted on a power shaft for rotation therewith, each compression rotor having associated therewith an induction and compression chamber defined in part by the periphery of the compression rotor, each compression rotor having provided at its periphery in driving relation therewith compression means forming a continuous seal with the walls of the associated induction and compression chamber, an inlet port in the wall of the induction and compression chamber, each working rotor having associated therewith a combustion chamber defined in part by the periphery of the working rotor, each working rotor having provided at its periphery in driving relation therewith impeller means forming a continuous seal with the walls of the associated firing chamber, an exhaust port in the wall of the combustion chamber, and transfer means providing intermittent communication between an induction and compression chamber and a combustion chamber.

To facilitate a full understanding of this invention, it will now be described in relation to a particular embodiment, illustrated in the accompanying drawings, in which.

Figure 4:
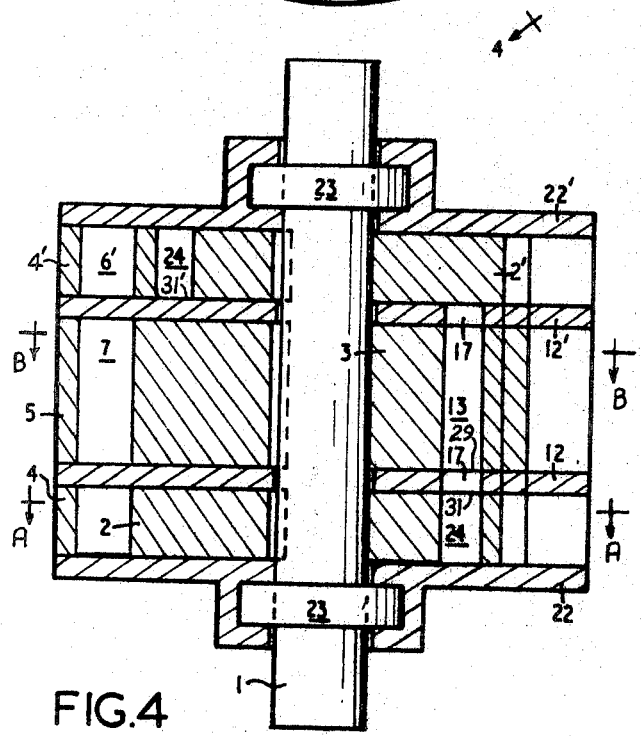
FIGURE 4 is a longitudinal section view of an engine in accordance with the present invention, employing fuel injection and spark ignition.

The engine illustrated comprises a single power shaft 1 mounted in bearing 23 carried in end plates 22, 22' (FIG. 4). Mounted on and keyed to power shaft 1 are three rotors, two compression rotors 2, 2', and a single working rotor 3.

Figure 2:
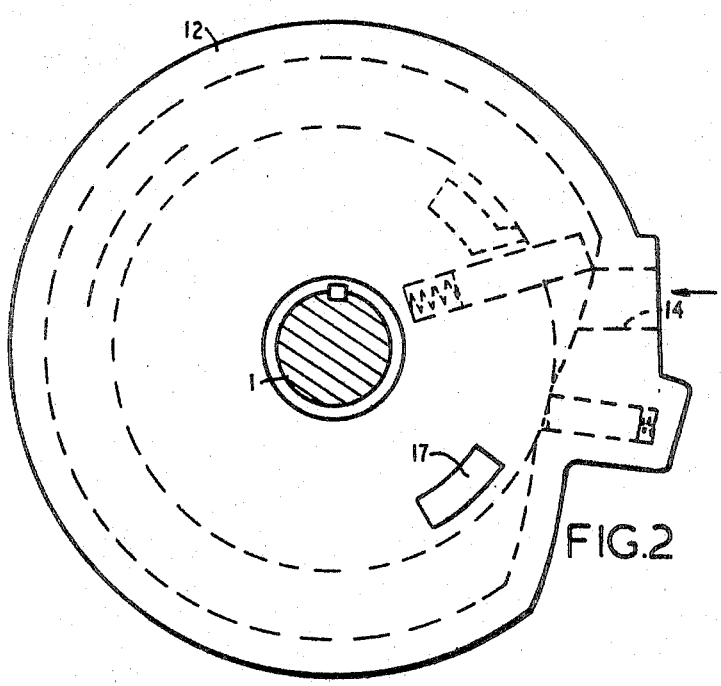
FIGURE 2 is a view illustrating a side wall separating the combustion chamber of FIG. 3 from a compression and induction chamber.

Working rotor 3 is separated from compression rotors 2, 2' by side walls 12, 12', shown in detail in FIG. 2. These side walls 12, 12', together with end plates 22, 22' and induction and compression housing 4, 4', define, with the periphery of each compression rotor 2, 2' induction and compression chambers 6, 6'. In accordance with the present invention, air is introduced into and compressed in chambers 6, 6', and the air so compressed is fed into the combustion chamber (described below) just before ignition.

Figure 1:
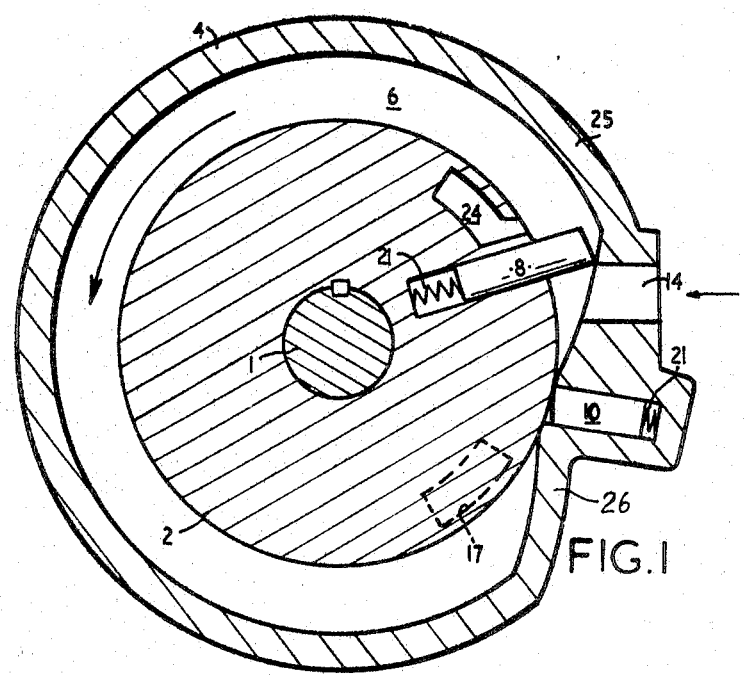
FIGURE 1 is a sectional view, taken on the line A—A in FIG. 4, showing a housing, chamber and rotor used in the induction and compression strokes.

In FIG. 1 the construction of one of the compression rotors and its associated induction and compression chambers is shown in detail. Each compression rotor is provided with an impeller means such as a blade or vane 8 mounted in the rotor so as to be movable in a generally radial direction and urged by spring 21 towards the opposite wall of the induction and compression chamber, that is to say, the inner wall of the housing 4, so that as it is driven around with rotor 2, its outer end maintains a seal with this wall. A seal is also effected by any known means between the chamber side walls (12 and 22) and the sides of the compression means 8.

Within compression rotor 2 and forward of the blade 8 is a cavity 24, communicating as shown in FIG. 1 with the periphery of the rotor at a point just forward of the blade 8. This transfer cavity 24 also opens on to the side of the rotor 2 at a cavity side port 31 (FIG. 4), and functions to transfer compressed air from chamber 6 to combustion chamber 7, as hereinafter described.

The inner wall of housing 4 is radially inwardly contoured in one region as indicated generally at 26 to contact the rotor periphery, and at the area of contact there is arranged a seal, which in this embodiment comprises a blade 10 similar to blade 8, urged by spring 21 against the periphery of rotor 2.

An inlet port 14 in wall 4 is located in the region immediately forward of seal 10.

Figure 3A:
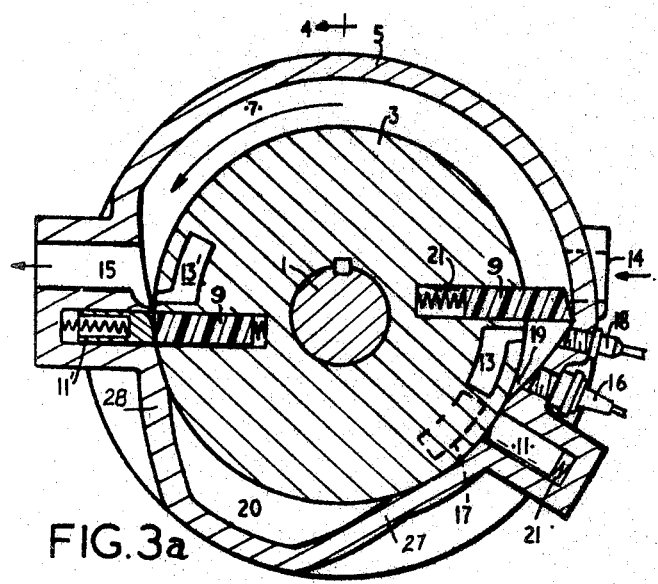
FIGURE 3a is a sectional view, taken on the line B—B in FIG. 4, showing the housing, rotor, and chamber used in the combustion and exhaust strokes.

Turning now to FIG. 3, wherein is shown the construction of working rotor 3 and its associated combustion chamber, it will be seen that this rotor is provided with a pair of blades 9, 9', similar to blade 8 previously described in relation to rotor 2 and constituting impeller means. These blades are similarly mounted in the rotor, and urged by springs 21 against the inner wall of combustion chamber housing 5. A transfer cavity 13 is provided in the rotor for each blade, each cavity 13, 13', communicating with the periphery of the rotor immediately forward, considered in the direction of rotation of rotor 3, as indicated by the arrow (FIG. 3), of one of the blades 9, and with the side of rotor 3 at side ports 29 and 30 at opposite sides of the rotor.

The inner wall of housing 5 is contoured radially inward, as generally indicated at 27 and 28, to contact the periphery of rotor 3 at two places. Seals 11, 11', similar to seals 10 described above in relation to rotors 2, are provided at each area of contact.

In the region immediately forward of seal 11 there is provided in the chamber wall a fuel injector head 18 and a spark plug 16. Immediately rearward of seal 11' is located an exhaust outlet 15.

The blades 9 are located at diametrically opposed points of rotor 3, as are the cavity side ports 29 and 30. Cavity side ports 29 and 30 are located at the same radial distance from the shaft axis as side ports 25 in the compression rotors 2. The side ports 31, 31', of the compression rotors are relatively displaced through 180° and so arranged that one side port 31, 31' is continuously registered with one side port 29, 30, side ports which are so registered opening onto adjacent rotor sides, so that but for the interposition of side walls 12, their respective cavities would be in continuous communication.

Side walls 12 are sealed by any suitable means, (not shown), such as a labyrinth seal, to the adjacent rotor sides, and are provided, at the same radial distance from the shaft axis as side ports 29, 30, 31, 31', with a transfer port 17 in the form of an aperture passing through the side wall. The two transfer ports 17 are arranged in registration.

The operation of the engine as thus far described will now be outlined. Blade 8 of a compression rotor 2 is illustrated in FIG. 1 at the position where it has just passed inlet port 14. As rotor 2 continues to rotate in the direction of the arrow (FIG. 2), air will be drawn through inlet 14 into the chamber 6 behind blade 8, while air, drawn into chamber 6 by the previous revolution of blade 8, and now trapped in the chamber by seal 10, will be compressed, reaching a maximum pressure and being forced into transfer cavity 24 as blade 8 approaches seal 10. Transfer cavity side port 29 now registers with transfer port 17, and the compressed air is thereby introduced via working rotor cavity 13 into the small space 19 defined by the contoured wall 27 and the trailing edge of the blade 9 (which is now approaching the position shown in FIG. 3). When blade 9 passes fuel injection head 18, fuel is injected into the chamber and the resulting mixture fired. Blade 9 is thereby driven around the chamber 7 by the exploding mixture, finally reaching the exhaust outlet 15, and immediately thereafter blade 9' will be in a firing position, cavity 13' and the region 19 having been filled with compressed air from the second injection and compression chamber 6'. Blade 9', in executing its firing stroke, scavenges from chamber 7 any combustion products remaining from the previous firing.

It will be seen that in this way the engine described performs, in a single combustion chamber, two firing strokes per revolution.

As shown in FIG. 3, the combustion chamber also comprises a well 20, provided for cooling and lubrication by means of a forced oil mist. Means such as a groove in the wall 5 is provided in well 20 to prevent a build up of pressure forward of blades 9, 9' as they pass through.

A most important feature of the engine described is that the size and shape of the combustion chamber 7 may be varied within wide limits, enabling engines to be designed for widely varying types of fuel. The different burning characteristics of different fuels may be accommodated with maximum efficiency simply by the choice of a suitable contour of the inner wall of housing 5 in the combustion region between seal 11 and the exhaust port. While in the two-bladed construction illustrated here, the maximum length of the combustion chamber is approximately one-half the circumference of the rotor, by choosing a suitable position for the exhaust outlet, the effective length of the combustion chamber can be set anywhere within this limitation.

In one preferred form of the invention, the engine volumes are so chosen for the maximum effective length of the combustion chamber that as each blade 9, 9', passes the exhaust outlet at the end of its firing stroke, the pressure behind it is below atmospheric, so that air rushes into the chamber ahead of the following blade. In this way the cooling of the engine is aided by the introduction of cool air into the actual combustion chamber. Engine cooling will also be assisted by the effect of the extended combustion chamber, which allows complete combustion of the fuel mixture and such expansion that the combustion products may be exhausted at close to ambient temperature.

Figure 5:
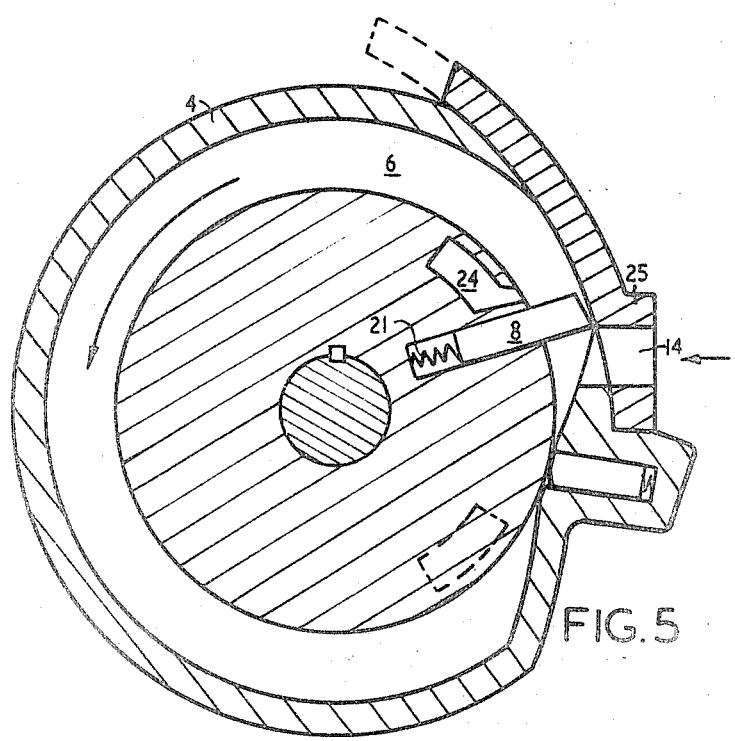
FIGURE 5 is a view partly in elevation and partly in section illustrating an alternative construction of induction and compression chamber.

In accordance with a modification of the engine described above, flexibility may be enhanced by arranging for a movable inlet port, as illustrated in FIGURE 5. In this figure the inlet port 14 is shown positioned on a sliding member 25, which is slidable on the working rotor housing 5. When the inlet port 14 is moved, the resulting change in the volume of air trapped ahead of blade 8 produces a change in the compression ratio of the engine, which when coupled to alterations in the ignition timing and fuel injection, allows the power output of the engine to be altered without changing the speed of revolution of the shaft. If all three functions are changed simultaneously, the capacity of the engine will be changed.

While the invention has been described in this embodiment in relation to a spark ignited engine, it is obvious that it is equally well adapted to an engine of the compression ignition type. Similarly, the invention is not restricted to use with fuel injection, but is equally applicable to carburation, as will be appreciated by those skilled in the art. A fuel-air mixture may then be drawn into and compressed in the induction and compression chambers. Furthermore, although the illustrated embodiment is shown having one compression blade means and two impeller blade means per rotor, the number of compression and impeller means may be varied to achieve design flexibility.

An engine made in accordance with the present invention is of course not limited to one combustion chamber and two compressors, more than one combustion chamber and working rotor may be arranged on the same shaft, and while it is believed that greatest efficiency is achieved by the combination of two compressors for each combustion chamber, this is not essential. Again, while the rotors and chambers are shown in the illustrated embodiment as having uniform diameters and axial widths, this is not of course essential, and the appropriate dimensions of each chamber and its associated rotor must be selected for the particular purpose in hand.

What is claimed is:

1. A rotary engine comprising a power shaft, at least one working rotor and at least one compression rotor mounted on said power shaft for rotation therewith, each compression rotor having associated therewith an induction and compression chamber defined in part by the periphery of the associated compression rotor, said induction and compression chamber comprising a generally cylindrical contoured wall having at least one radially inwardly contoured portion contacting the periphery of the associated compression rotor over port of its circumference, means effecting a seal between the rotor and said wall at their area of contact, each compression rotor having provided at its periphery in driving relation therewith compression means forming a continuous seal with the walls of the associated induction and compression chamber, said compression means being arranged to adapt itself to the contour of the wall so as to maintain a seal therewith, an inlet port in the wall of the induction and compression chamber, each working rotor having associated therewith a combustion chamber defined in part by the periphery of the associated working rotor, each working rotor having provided at its periphery in driving relation therewith impeller means foming a continuous seal with the walls of the associated combustion chamber, an exhaust port in the wall of each combustion chamber, and transfer means providing intermittent communication between an induction and compression chamber and a combustion chamber, said transfer means including a transfer cavity communicating with the periphery of the compression rotor at a point immediately forward, considered in relation to the direction of the rotor of said compression means.

2. A rotary engine comprising a power shaft, at least one working rotor and at least one compression rotor mounted on said power shaft for rotation therewith, each rotor being positioned between a pair of side walls closely adjacent and parallel to the rotor sides, sealing means between each rotor side and the adjacent side wall, each compression rotor having associated therewith an induction and compression chamber defined in part by the periphery of the compression rotor, each compression rotor having provided at its periphery in driving relation therewith compression means forming a continuous seal with the walls of the associated induction and compression chamber, an inlet port in the wall of the induction and compression chamber, each working rotor having associated therewith a combustion chamber defined in part by the periphery of the working rotor, each working rotor having provided at its periphery in driving relation therewith impeller means forming a continuous seal with the walls of the associated combustion chamber, transfer means providing intermittent communication between an induction and compression chamber and a combustion chamber, said induction and compression chamber being further defined by the periphery of a compression rotor, an extension of the side walls adjacent said compression rotor, and a generally cylindrical contoured wall having at least one radially inwardly contoured portion contacting the periphery of said compression rotor over part of its circumference, means effecting a seal between the rotor and the wall at their area of contact, said compression means being arranged to adapt itself to the contour of the interior wall so as to maintain a seal therewith, said transfer means including a transfer cavity in said compression rotor communicating with the periphery thereof at a point immediately forward, when considered in relation to the direction of rotation of the rotor, of said compression means, said transfer means further including a transfer port in the form of a cavity in a side wall adjacent said compression rotor, said transfer cavity communicating at a cavity side port, with the side of said compression rotor facing the last-mentioned side wall at the same radial position as said transfer port so that said cavity side port registers with said transfer port one each revolution of said rotor, the circumferential disposition of said transfer port being such that this registration occurs when said compression means is immediately rearward of said area of contact.

3. The rotary engine as claimed in claim 2, said inlet port being located immediately forward, when considered in relation to the direction of rotation of the compression rotor, of said area of contact.

4. The rotary engine as claimed in claim 2, in which said inlet port is movable circumferentially of said induction and compression chamber, thereby to alter the compression ratio of the engine.

5. The rotary engine as claimed in claim 2, wherein said compression means comprises a rigid blade mounted in said compression rotor for radial movement relative thereto and resiliently urged against said contoured wall.

6. A rotary engine comprising a power shaft, at least one working rotor and at least one compression rotor mounted on said power shaft for rotation therewith, each rotor being positioned between a pair of side walls closely adjacent and parallel to the rotor sides, sealing means between each rotor side and the adjacent side wall, each compression rotor having associated therewith an induction and compression chamber defined in part by the periphery of the compression rotor, each compression rotor having provided at its periphery in driving relation therewith compression means forming a continuous seal with the walls of the associated induction and compression chamber, an inlet port in the wall of the induction and compression chamber, each working rotor having associated therewith a combustion chamber defined in part by the periphery of the working rotor, each working rotor having provided at its periphery in driving relation therewith impeller means forming a continuous seal with the walls of the associated combustion chamber, transfer means providing intermittent communication between an induction and compression chamber and a combustion chamber, said combustion chamber being further defined by the periphery of a working rotor, an extension of the side walls adjacent said working rotor, and a generally cylindrical wall having first and second radially inwardly contoured portions contacting the periphery of said working rotor over part of its circumference at first and second circumferentially displaced areas, means at said first and second circumferentially displaced areas, means at said first and second areas effecting a seal between the rotor and said well, the rotor being provided with first and second diametrically oppositely disposed driving means, said exhaust outlet being located in a region immediately rearward, when considered in relation to the direction of rotation of said working rotor, of said second area, each working rotor having provided at diametrically opposite points on its periphery in driving relation therewith first and second vanes forming a continuous seal with the walls of the associated combustion chamber, said transfer means including a first transfer cavity in the said working rotor communicating with the periphery thereof in a region immediately rearward of said first driving means, a second transfer cavity in said working rotor communicating with the periphery thereof in a region immediately rearward of said second driving means, said first and second transfer cavities communicating, at respective first and second cavity side ports, respectively with opposite sides of said working rotor, namely a first side facing a first side wall and a second side facing a second side wall, a first transfer port in the form of an aperture in said first side wall at the same radial position as said first cavity side port, so that said first cavity side port registers with said transfer port once during each revolution of said working rotor, a second transfer port in the form of an aperture in said second side wall at the same radial position as said second cavity side port so that said second cavity side port registers with said second transfer port once during each revolution of said working rotor, said first cavity side port and said first transfer port being so located that their registration occurs when the communication of said first cavity with the periphery of said working rotor lies at or in the region immediately forward of said first area of contact, said second cavity side port and said second transfer port being so located that their registration occurs when the communication of said second transfer cavity with the periphery of said working rotor lies at or in the region immediately forward of said first area of contact.

7. The rotary engine as claimed in claim 6 comprising a cooling and lubricating chamber defined by the periphery of said working rotor, said side walls, and said generally cylindrical wall in the region forward, in relation to the direction of rotation of said working rotor, of said second area of contact.

8. The rotary engine as claimed in claim 6, wherein said first and second driving means comprise resilient blades or vanes.

9. The rotary engine as claimed in claim 6, wherein said first and second driving means each comprise a rigid blade mounted in said working rotor for radial movement relative thereto and resiliently urged against said contoured wall.

10. The rotary engine as claimed in claim 6 wherein means for igniting a fuel mixture is located in said region immediately forward of said first area.

11. The rotary engine as claimed in claim 6, the arrangement being such that when said driving means pass said exhaust outlet, combustion products in the combustion chamber behind said driving means are at a pressure less than that existing outside the exhaust outlet.

12. The rotary engine as claimed in claim 6, wherein means for the introduction of fuel is located in a region immediately forward of said first area.

References Cited

UNITED STATES PATENTS

| | | |
|---|---|---|
| 1,275,619 | 8/1918 | Smiley. |
| 1,923,500 | 8/1933 | Northey. |
| 1,974,282 | 9/1934 | Kempton. |
| 2,040,036 | 5/1936 | Weeks. |
| 2,754,762 | 7/1956 | Prendergast ____ 230—158 XR |
| 3,139,722 | 7/1964 | Yokoi. |
| 3,228,196 | 1/1966 | Paulsen. |

FOREIGN PATENTS 1,384,006  11/1964  France.

MARK M. NEWMAN, Primary Examiner

U.S. Cl. X.R.

123—8